(12) United States Patent
Waqas et al.

(10) Patent No.: US 9,137,503 B2
(45) Date of Patent: Sep. 15, 2015

(54) LENS AND COLOR FILTER ARRANGEMENT, SUPER-RESOLUTION CAMERA SYSTEM AND METHOD

(75) Inventors: Malik Waqas, Stuttgart (DE);
Muhammad Siddiqui, Esslingen (DE);
Markus Kamm, Karlsruhe (DE);
Manfred Manz, Ostfildern (DE)

(73) Assignee: SONY Corporation, Tokyo (JP)

( * ) Notice: Subject to any disclaimer, the term of this patent is extended or adjusted under 35 U.S.C. 154(b) by 26 days.

(21) Appl. No.: 13/240,361

(22) Filed: Sep. 22, 2011

(65) Prior Publication Data

US 2012/0105691 A1 May 3, 2012

(30) Foreign Application Priority Data

Nov. 3, 2010 (EP) .................................. 10014268

(51) Int. Cl.
*H04N 9/04* (2006.01)
*G06T 3/40* (2006.01)

(52) U.S. Cl.
CPC .............. *H04N 9/045* (2013.01); *G06T 3/4015* (2013.01); *G06T 3/4069* (2013.01); *H04N 2209/046* (2013.01); *Y10T 29/49826* (2015.01)

(58) Field of Classification Search
CPC .............. H04N 9/045; H04N 5/23212; H04N 5/23229; H04N 13/0257; H04N 2209/046; H04N 5/142; H04N 5/23254; H04N 5/2355; H04N 5/347; H04N 2209/04
USPC .................................................. 348/280, 208
See application file for complete search history.

(56) References Cited

U.S. PATENT DOCUMENTS

| | | | | |
|---|---|---|---|---|
| 7,379,612 B2* | 5/2008 | Milanfar et al. | ............. | 382/254 |
| 7,453,498 B2* | 11/2008 | Prentice et al. | ............ | 348/222.1 |
| 7,940,282 B2* | 5/2011 | Milanfar et al. | ............. | 345/606 |
| 2007/0034777 A1* | 2/2007 | Tuckerman et al. | ....... | 250/208.1 |
| 2007/0070267 A1* | 3/2007 | Yang | ............................. | 349/106 |
| 2009/0101947 A1 | 4/2009 | Lin et al. | | |
| 2010/0128149 A1* | 5/2010 | Kim et al. | .................... | 348/242 |

FOREIGN PATENT DOCUMENTS

EP 1 699 233 A1 9/2006

OTHER PUBLICATIONS

Xin Li, "Demosaicing by Successive Approximation", IEEE Transactions on Image Processing, vol. 14, No. 3, Mar. 2005, pp. 370-379.
Sina Farsiu, et al., "Multi-Frame Demosaicing and Super-Resolution of Color Images", IEEE Transactions on Image Processing, vol. 15, No. 1, Jan. 2006, 39 pages.

* cited by examiner

*Primary Examiner* — James Hannett
*Assistant Examiner* — Padma Haliyur
(74) *Attorney, Agent, or Firm* — Oblon, McClelland, Maier & Neustadt, L.L.P.

(57) ABSTRACT

A camera system includes lens units such that each lens unit is assigned to a single-color color filter unit. The lens and color filter assembly may be combined with pixel units such that a plurality of monochromatic, low-resolution images can be obtained, and the monochromatic images refer to shifted versions of the same image object. By a super-resolution technique that includes shift-compensation a mosaicked image is obtained, which is then demosaiced. In the resultant image, only few artifacts appear. Simple color filter arrays allow a simplified fabrication process and provide less chromatic aberrations at less computational effort.

20 Claims, 13 Drawing Sheets

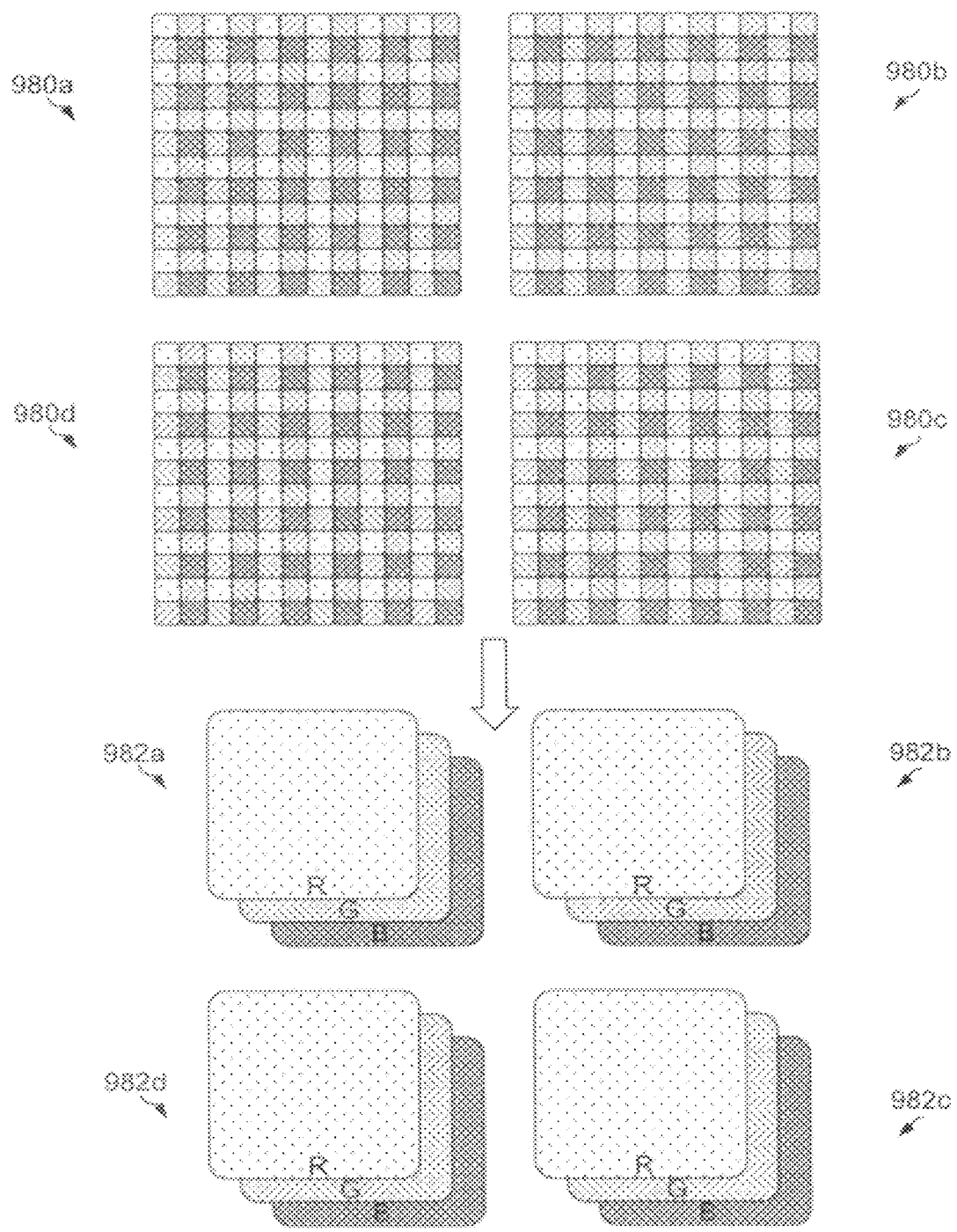

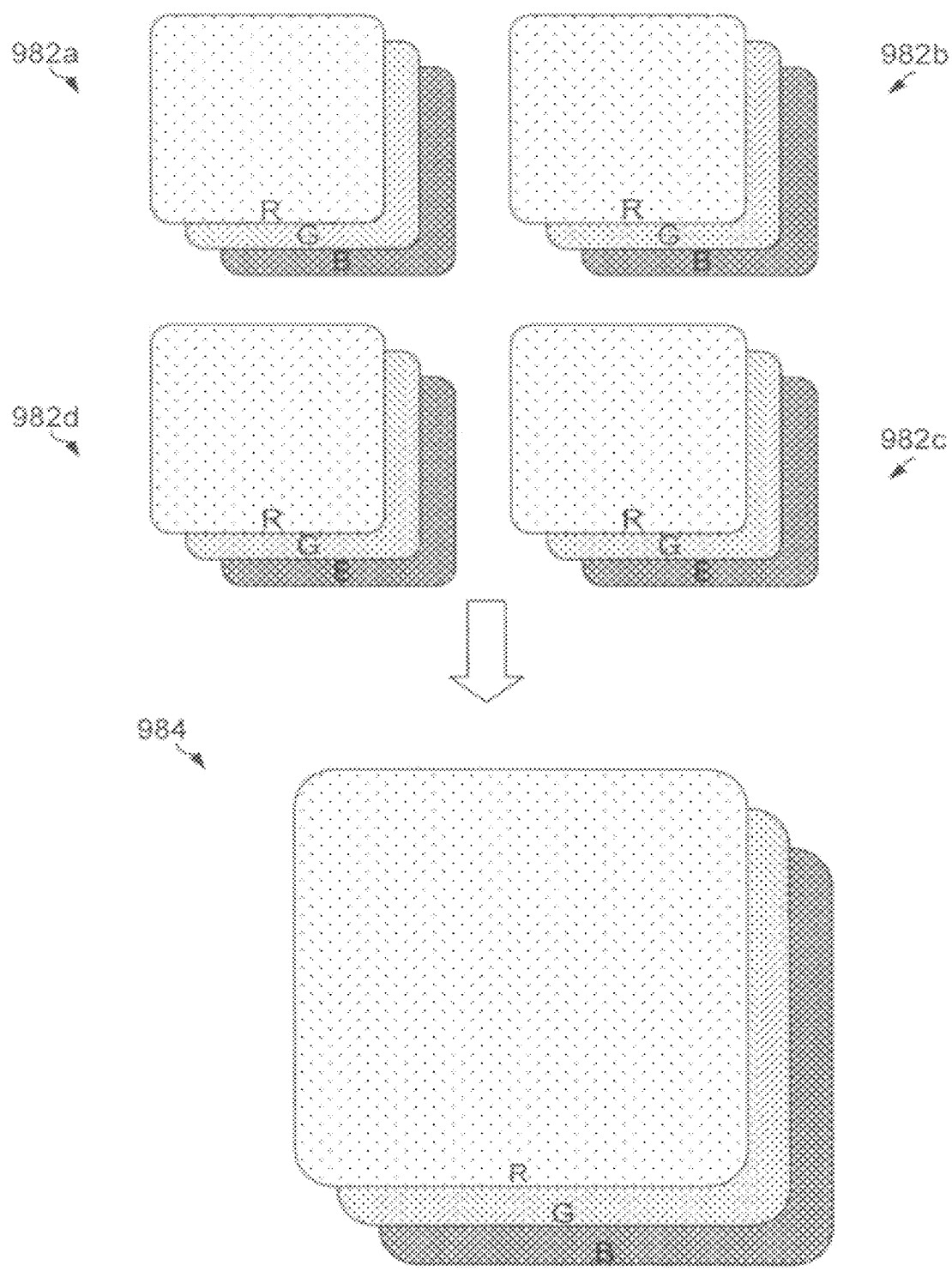

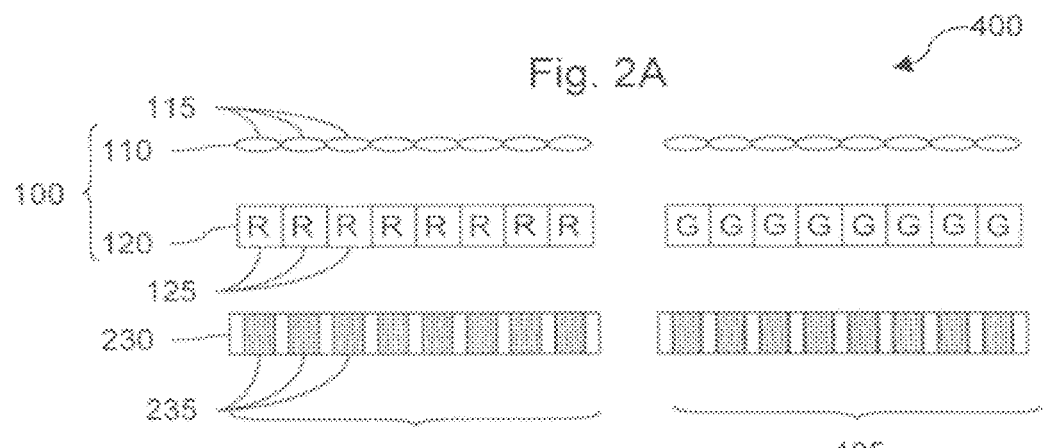

Fig. 2D
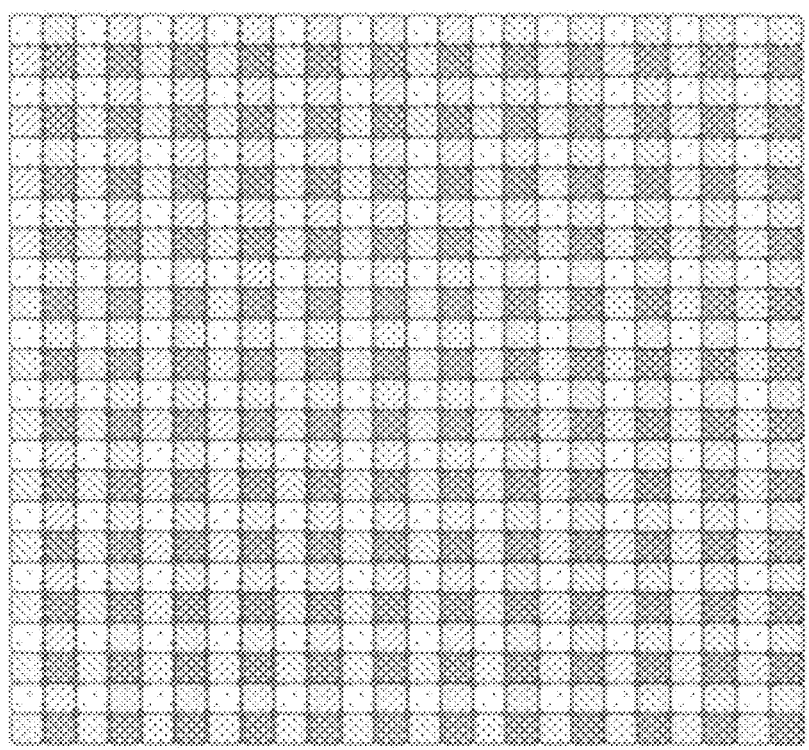
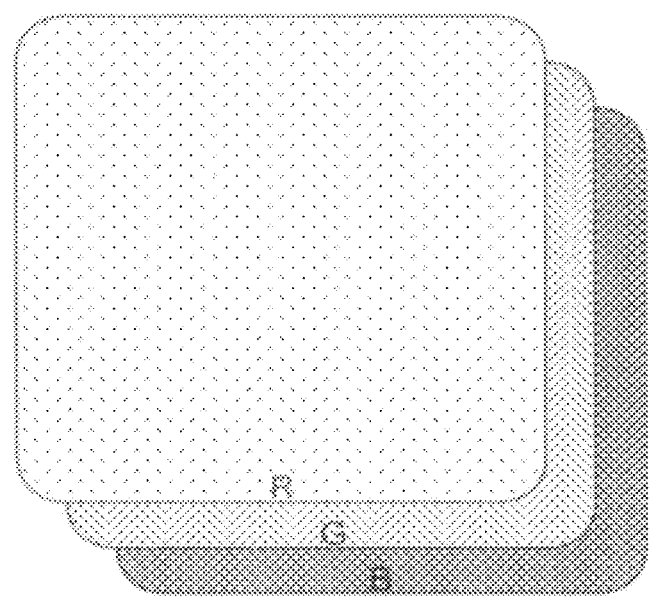

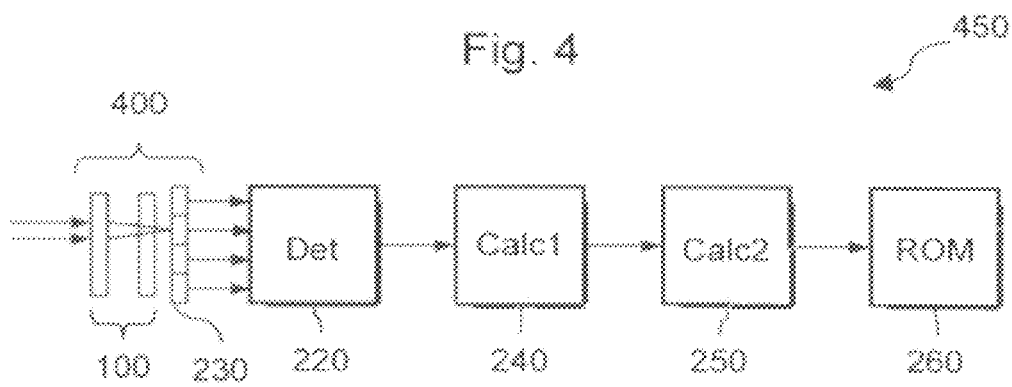

LENS AND COLOR FILTER ARRANGEMENT, SUPER-RESOLUTION CAMERA SYSTEM AND METHOD

This application claims the benefit of European Patent Application No. 10014268.6 filed on Nov. 3, 2010, in European Patent Office, the entire disclosure of which is incorporated herein by reference.

BACKGROUND OF THE INVENTION

1. Field of the Invention

The present invention relates to the field of electronic photography. An embodiment relates to a camera system with a plurality of lens units for using super-resolution techniques. Another embodiment refers to a lens and colour filter arrangement for such a camera system. Further embodiments refer to a method of operating a camera system using super-resolution and to a method of manufacturing such a camera system.

2. Description of Related Art

A conventional digital camera uses a colour filter array arranged over a sensor array such that each image pixel is associated with a particular filter colour and each image pixel signal relates to one colour, for example to either red, green or blue. Accordingly, the number of pixels assigned to each colour is only a subset of all available image pixels. To obtain a full resolution image for each filter colour, demosaicing methods estimate or interpolate missing pixel values from the pixel values of the surrounding pixels for each filter colour. A method of demosaicing using successive approximation is described in Xin Li; "Demosaicing by Successive Approximation"; IEEE Transactions on Image Processing, Vol. 14, No. 3, March 2005. Further in the field of electronic photography, compound-eye cameras are known that include lens arrays to obtain a plurality of low-resolution images on a photo detector, each of the low-resolution images representing shifted versions of the same scene. EP 1 699 233 A1 refers to a method of estimating a single high-resolution image from a plurality of low-resolution images.

Sina Farsiu et al., "Multi-Frame Demosaicing and Super-Resolution of Colour Images", IEEE Transactions on Image Processing, Vol. 15, No. 1, pp. 141-159, January 2006 refers to a general model for imaging systems merging super-resolution and demosaicing into one process.

BRIEF SUMMARY OF THE INVENTION

The object of the invention is to provide an enhanced camera system merging super-resolution and demosaicing. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

BRIEF DESCRIPTION OF THE SEVERAL VIEWS OF THE DRAWINGS

FIG. 1C is a schematic diagram illustrating a process of demosaicing low-resolution images obtained by the arrangement of FIGS. 1A and B.

FIG. 1D is a schematic diagram illustrating a super-resolution process on the basis of the low-resolution images obtained by the demosaicing process of FIG. 1C.

FIG. 2A is a schematic cross-sectional view of an arrangement including a lens and colour filter arrangement according to an embodiment of the invention.

FIG. 2B is a schematic top view of the arrangement of FIG. 2A.

FIG. 2D is a schematic diagram illustrating the process of demosaicing the mosaicked image of FIG. 2C to obtain a polychromatic high-resolution image.

FIG. 4 is a schematic block diagram of a camera system in accordance with another embodiment.

FIG. 5A is a simplified flowchart referring to a method of operating a camera system.

DETAILED DESCRIPTION OF THE INVENTION

Figure 1A:
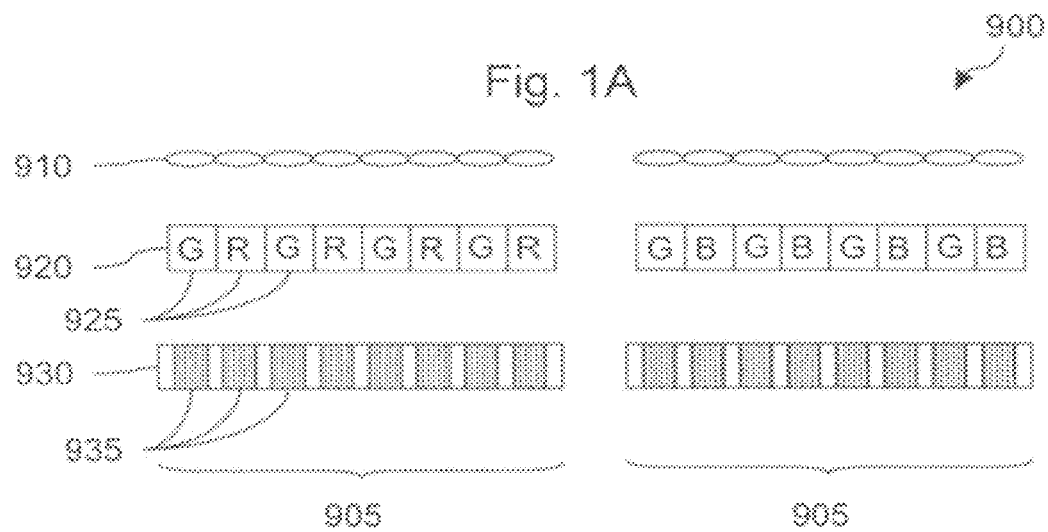
FIG. 1A is a schematic cross-sectional view of an arrangement including lens units, colour filter units and pixel units for discussing effects of the invention.

FIG. 1A refers to an image sensor device 900 with several image sensor units 905. Each image sensor unit 905 includes a lens unit 910 focussing an image of a scene or object on a pixel unit 930 of the respective image sensor unit 910. Each pixel unit 930 comprises a plurality of pixel sensors 935. A colour filter unit 920 is arranged between each lens unit 910 and the corresponding pixel unit 930. The colour filter unit 920 includes a plurality of colour filter sections 925, wherein each colour filter section 925 has a filter colour, for example green, red or blue. Each colour filter section 925 is assigned to one pixel sensor 935 such that each pixel sensor 935 receives colour-specific image information.

Figure 1B:
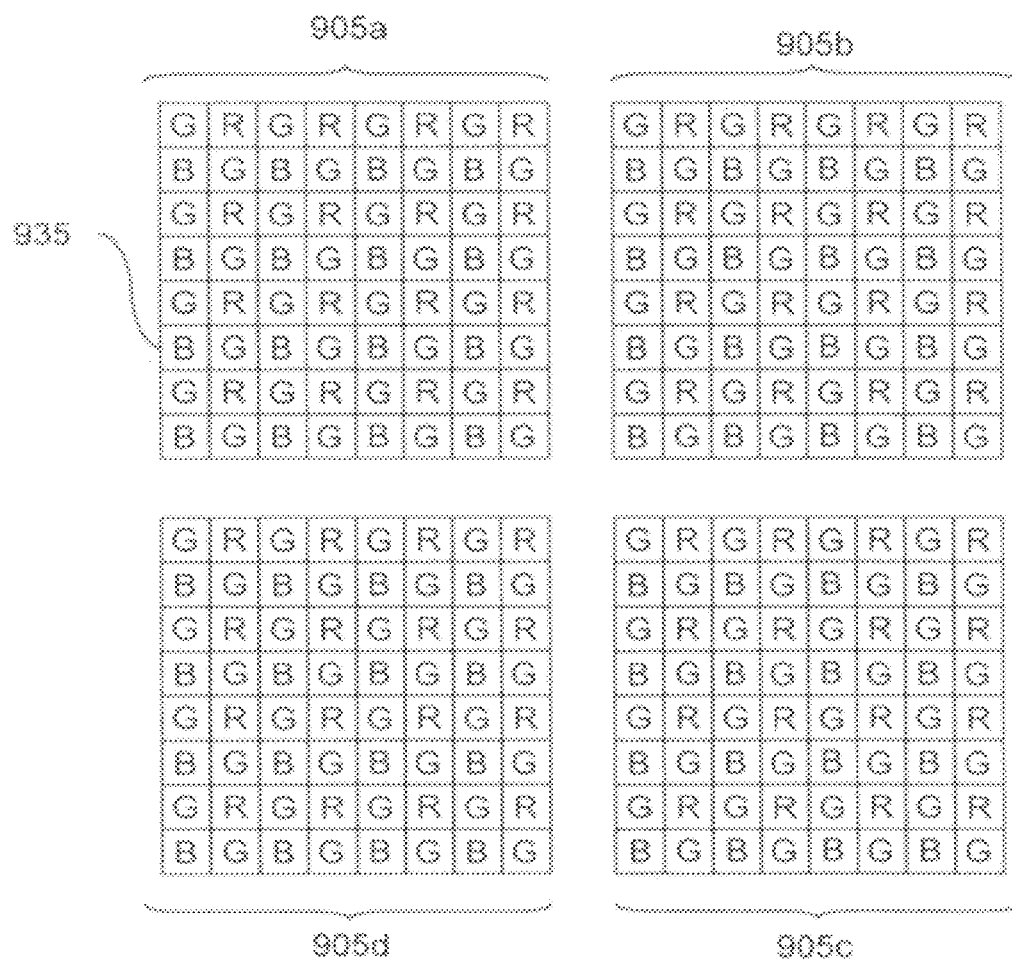
FIG. 1B is a schematic top view of the arrangement of FIG. 1A.

FIG. 1B shows a typical assignment of filter colours R, G, B to colour filter sections and the corresponding pixel sensors 935. Four of the image sensor units 905a-d including a lens unit 910, a colour filter unit 920 and a pixel unit 930 respectively, can be arranged to form a matrix, wherein each image sensor units 905a-d receives shifted versions of the original scene.

Referring now to FIG. 1C, each of the four image sensor units 905a-d generates, for each filter colour R, G, B a low-resolution image 980a-d. Each low-resolution image 980a-d is described by a lower number of pixel values than pixel sensors are available in each pixel unit. Using demosaicing techniques, for each image sensor units 905a-d and for each filter colour the pixel values of image pixels assigned to another filter colour are estimated on the basis of, for example, the surrounding pixel values. As a result, for each image sensor unit 905a-d and each filter colour an up-sampled monochromatic image is derived having, for example, the same number of pixel values as each pixel unit has pixel sensors. The lower half of FIG. 1C shows the four resulting sets 982a-d of monochromatic, "blown-up" images. The sets of monochromatic images 982a-d refer to shifted versions of the same scene.

As shown in FIG. 1D the monochromatic images of the sets 982a-d are combined by super-resolution techniques to obtain, for each filter colour, a high-resolution image from which a polychromatic high resolution image 984 can be obtained by appropriate superposition techniques selected in accordance with the used filter colours.

Figure 1E:
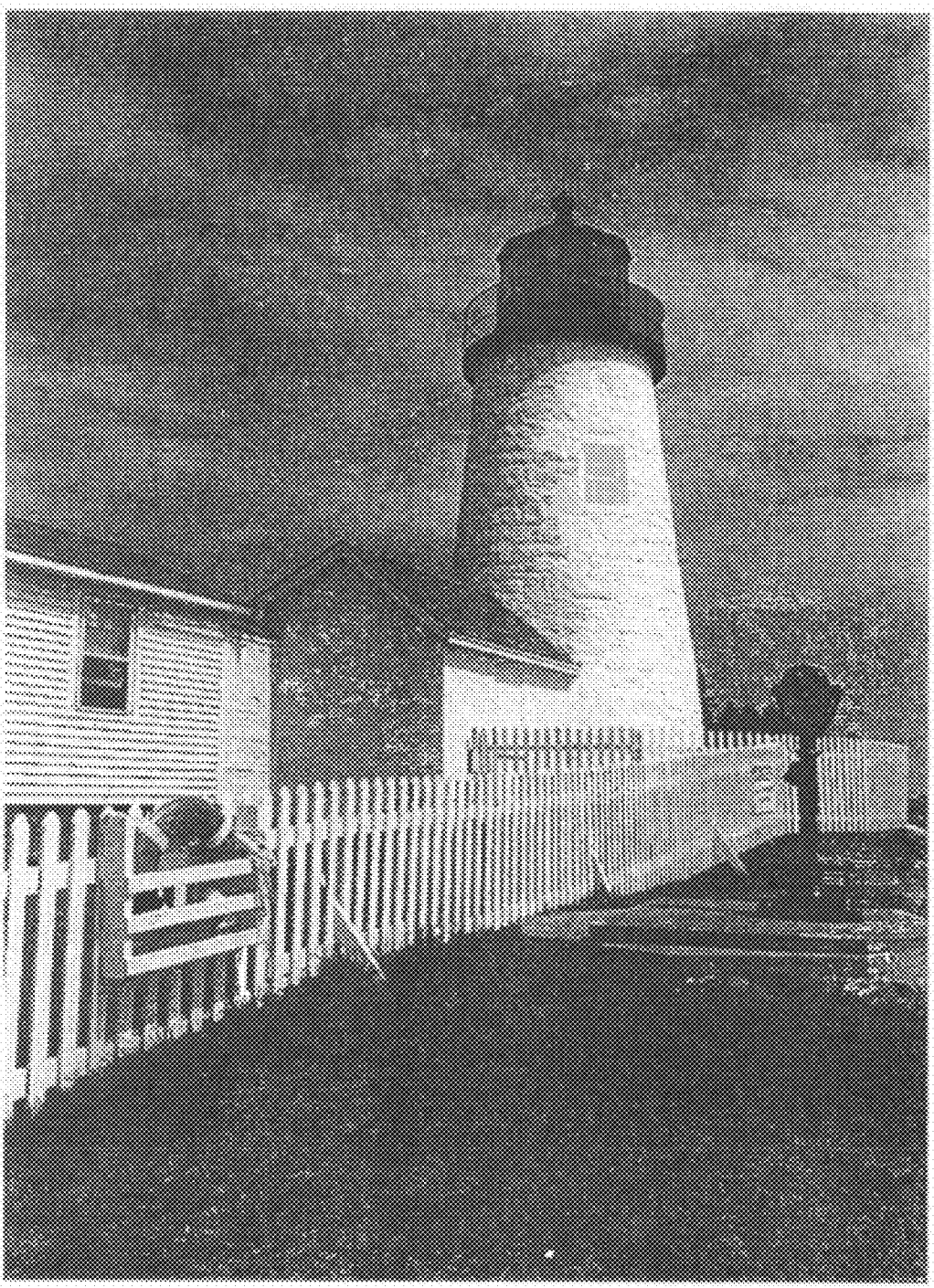
FIG. 1E is a reference image of a test scene.
Figure 1F:
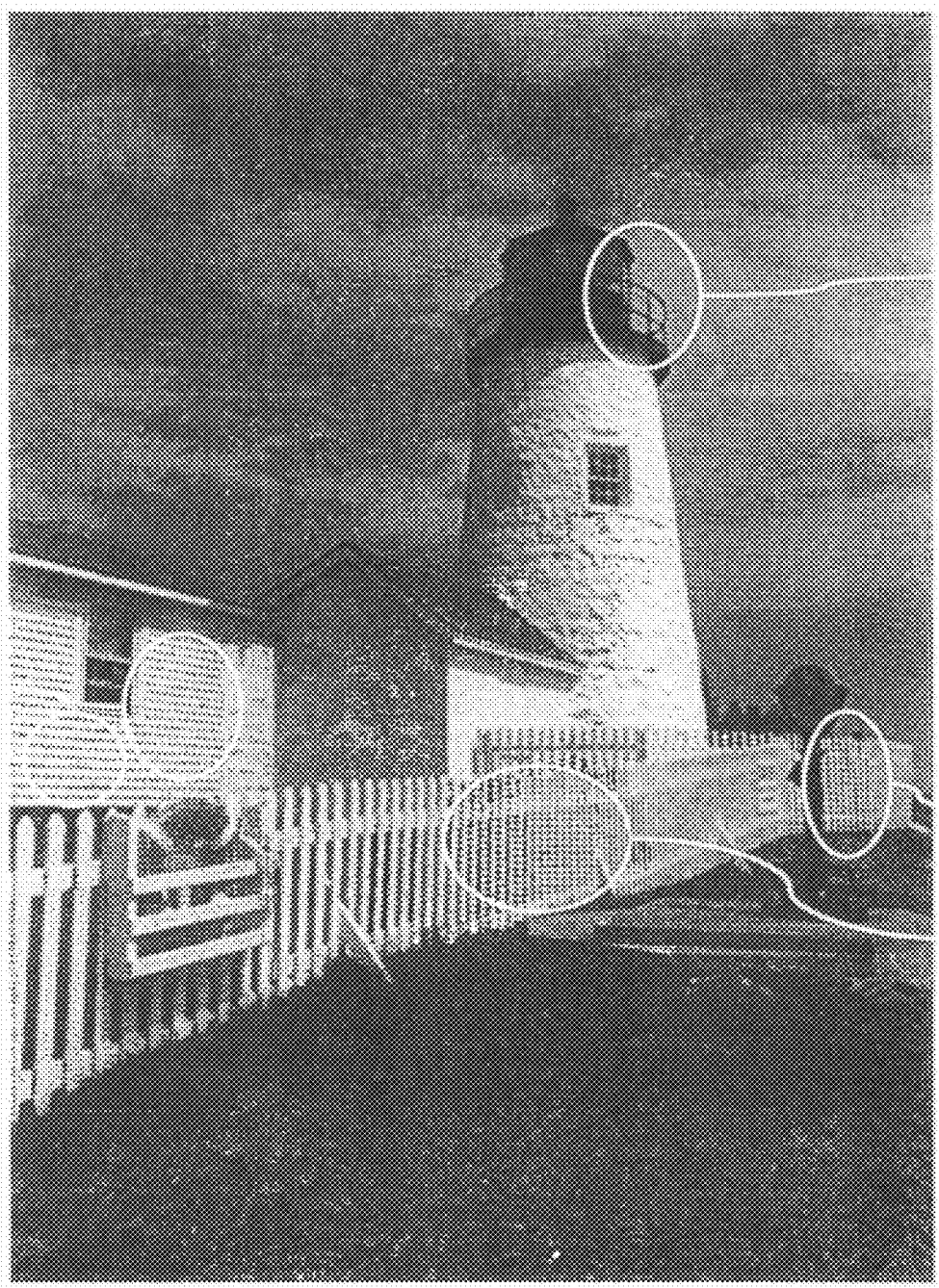
FIG. 1F is an image obtained from the test scene of FIG. 1E by a conventional approach for combining demosaicing and super-resolution processes as described with FIGS. 1C and D for discussing effects of the invention.

FIG. 1E shows an original image and FIG. 1F an image obtained by reconstructing a full colour high-resolution image from a set of low-resolution images captured by a lens array camera system with colour filters arranged in a Bayer mosaic pattern. FIG. 1F shows that applying a super-resolution approach to demosaiced low-resolution images produces typical artefacts. For example, the vertical pickets in the fence in areas 993, 992, which appear bright beige in the original test scene, undergo a colour aberration and appear partly yellow and partly blue. The horizontal shelves in regions 995 appear to be superimposed by yellow and blue diagonal stripes. In regions 991 and 994 zipper artefacts and aliasing occurs with regard to the shelves and thin guardrail rods, where pixels along edges appear to be alternately on or off the edge. Smaller pixel sensor areas result in stronger aliasing effects in the low-resolution images. The aliasing effects in the low-resolution images result in artefacts after demosaicing as shown in FIG. 1F.

FIG. 2A refers to a lens and colour filter assembly 100 according to an embodiment of the invention. The lens and colour filter assembly 100 includes a plurality of lens units 110 and colour filter units 120, wherein each colour filter unit 120 is assigned to one of the lens units 110. Each colour filter unit 120 includes a plurality of colour filter sections 125. The colour filter sections 125 may be separated from each other by separation structures or may directly adjoin to each other to form a continuous, homogeneous structure or layer. Each colour filter section 125 filters light by wavelength range, wherein the wavelength range describing the passing light defines the filter colour of a colour filter section 235.

According to the embodiments of the invention the lens and colour filter assembly 100 comprises colour filter sections 235 of at least three different filter colours wherein each colour filter unit 120 is single-coloured and contains only colour filter sections 125 of the same filter colour. According to an embodiment each lens unit 110 may be realized as a micro-lens array formed by a plurality of micro-lenses 115, wherein each micro-lens 115 is assigned to one single of the colour filter sections 125. Light that orthogonally incidents on and passes through one of the micro-lenses 115 passes through one single of the colour filter sections 125. The micro-lens array may be formed from silicon oxide, by way of example.

FIG. 2A further refers to an image sensor device 400 with a plurality of image sensor units 405. Each image sensor unit 405 includes one lens unit 110, one colour filter unit 120 and one pixel unit 230, such that each pixel unit 230 is assigned to one of the lens units 110 and one of the colour filter units 120. Each pixel unit 230 includes a plurality of pixel sensors 235, wherein each pixel sensor 235 contains a photosensor for converting a photosignal from an incident light into an electronic signal. The pixel sensors 235 may be formed in a semiconductor substrate and transparent layers may separate the colour filter unit 120 from the pixel unit 230 and the lens unit 110. Each image sensor unit 405 contains colour filter sections 125 with the same filter colour such that each image sensor unit 405, delivers a monochromatic image of a scene. The image sensor device 400 with the lens and colour filter assembly 100 comprises at least three image sensor units 405 with three different filter colours. The colour filter units 120 are single-coloured such that each of them projects a monochromatic image on the respective pixel unit 230.

According to an embodiment, the lens and colour filter assembly 100 comprises an even number of lens and colour filter units 110, 120 arranged in a matrix. For example, the lens and colour filter assembly 100 may contain four lens units 110 and four colour filter units 120 wherein the colour filter units 120 are arranged to form a Bayer mosaic pattern wherein colour filter units 120 containing colour filter sections 125 with the filter colour "Green" are arranged on a first diagonal and one colour filter unit 120 containing colour filter sections 125 with the filter colour "Red" and one colour filter 120 with colour filter sections 125 with the filter colour "Blue" are arranged on the other diagonal of the matrix. With the Bayer mosaic pattern the sampling rate for the filter colour "Green" is twice that of the filter colours "Red" and "Blue" to take into account that the colour green carries most of the luminance information for the human eye.

According to another embodiment, filter units 120 are arranged to form a RGBE-mosaic pattern with "Emerald" as a fourth filter colour, a CYYM mosaic pattern with one cyan, two yellow and one magenta colour filter units 120 or a CYGM mosaic pattern with one cyan, one yellow, one green and one magenta colour filter unit. According to another embodiment, the lens and colour filter arrangement 100 includes three colour filter units 120 and a transparent unit without colour filtering properties and transmissive for all colours. The transparent and the colour filter units 120 may be arranged to form an RGBW Bayer mosaic pattern, or a 4×4 or 2×4 RGBW mosaic pattern, by way of example.

FIG. 2B refers to an embodiment with four image sensor units 405a-d arranged in a 2×2 matrix, wherein the filter colours assigned to the respective colour filter units form a Bayer pattern. In addition, corresponding pixel sensors 235 in the image sensor unit 405a-d are shifted against each other with reference to a reference point in the imaged scene such that each image sensor unit 405a-d images the scene from slightly deviating positions. For example, the images captured by the image sensor units 405a-d have a sub-pixel shift among each other.

FIG. 4 refers to a camera system 450 including a lens and colour filter arrangement 100 and pixel units 230. A detection unit 220 obtains from each pixel unit 230 monochromatic, low-resolution images, wherein the monochromatic low-resolution images of different pixel units 230 are shifted versions of the same scene or object. For example, with regard to an embodiment containing a plurality of image sensor units arranged in a MxN matrix the images obtained from image sensor units of the same column may be shifted by the same shift value along a first direction with regard to the images obtained from image sensor units assigned to neighbouring columns. Accordingly, images obtained from image sensor units assigned to the same row may be shifted by the same amount along a second direction, which may be perpendicular to the first direction, with regard to the image sensor units assigned to neighbouring rows. The shift amount may be the half pixel width in the corresponding direction or an odd multitude of the respective half pixel width.

A first calculator unit 240 combines the monochromatic low-resolution images obtained from the pixel units 230 to a mosaicked image by shift-compensation and interdigitating pixel values output by the pixel sensors of the pixel units.

For example, from two monochromatic low-resolution images shifted along a first direction, a first up-sampled picture may be obtained where each odd column results from the first low-resolution image and each even column results from the second low-resolution image. From two of such pairs of low-resolution images shifted along a second direction perpendicular to the first direction a further up-sampled image may be obtained, wherein each odd row is given by the first up-sampled picture of the first pair and each even row may be defined by the first up-sampled picture of the second pair of primary images.

Figure 6:
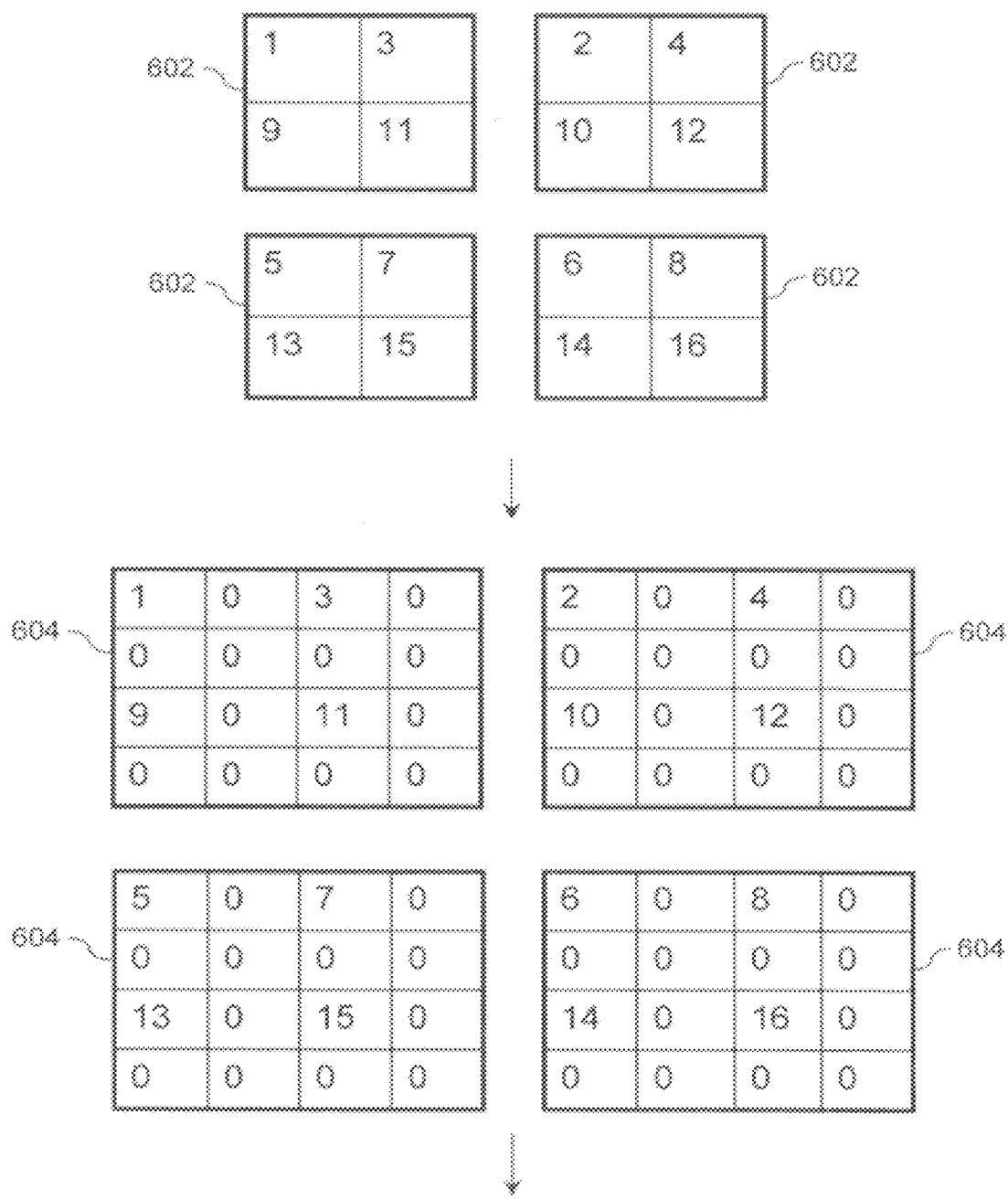
FIG. 6 is a schematic diagram for illustrating a process of shift compensation and interdigitating according to an embodiment of the invention.
Figure 6:
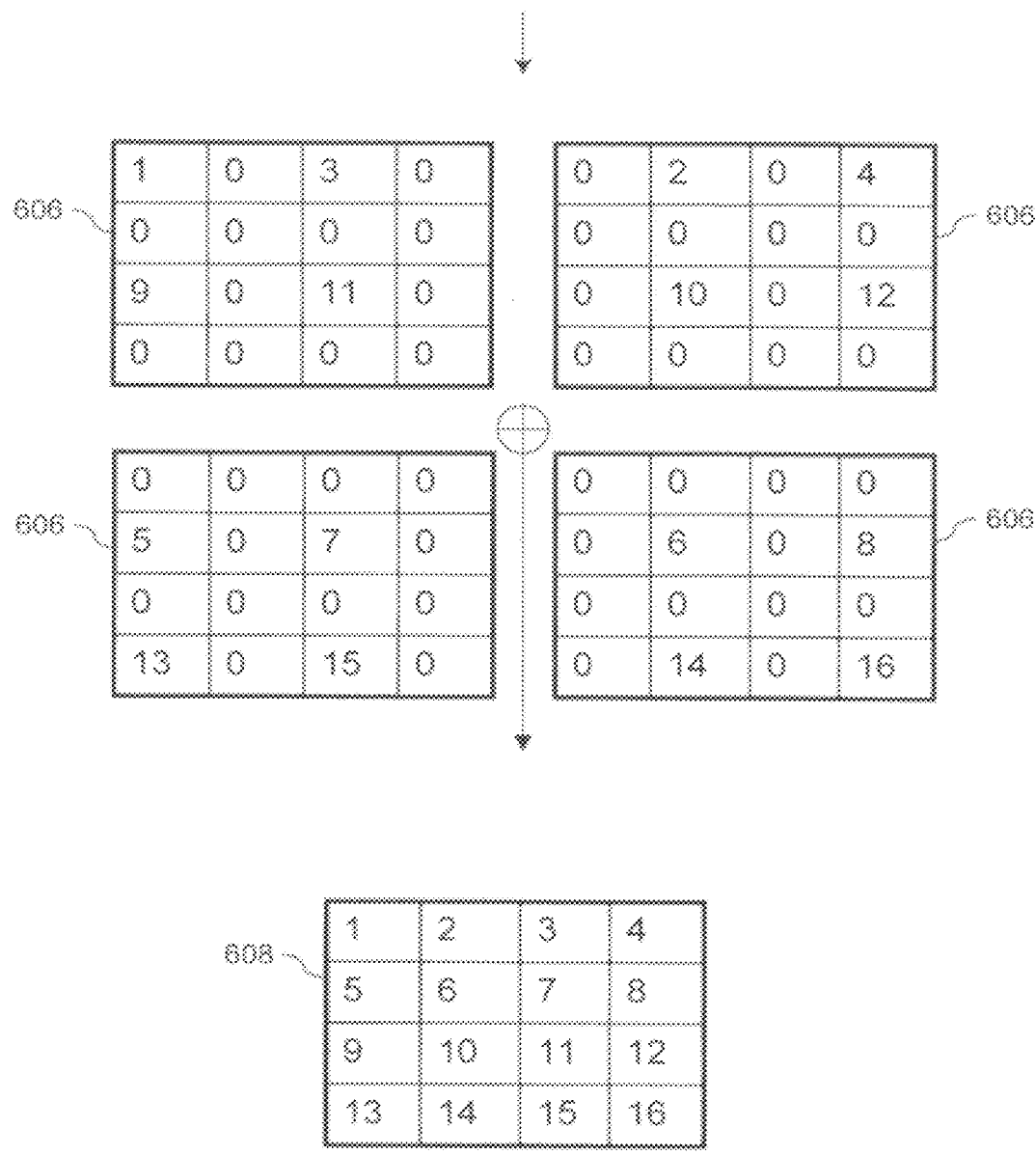

FIG. 6 illustrates the process of interdigitating by way of an example referring to four monochromatic low-resolution images 602 obtained from four matrix-like arranged pixel units. The shift between the four images 602 corresponds to a half-pixel displacement between the images 602 above and below and a half-pixel displacement between the images 602 on the left hand side and that on the right hand side. The four images 602 are schematically illustrated at the top of the Figure, wherein numbers 1 to 16 are used to identify corresponding pixel values in the following.

In a first step, from each low-resolution image 602 an up-sampled image 604 is obtained by inserting zero columns and zero rows. For example, each even column is a zero column containing only zero values and each even row is a zero row containing only zero values. The remaining values are obtained from the original low-resolution image 602, wherein the position of the values relative to each other is maintained.

In a second step the pixel values in three of the up-sampled images 604 are shifted corresponding to their respective shift values to obtain up-sampled shifted images 606. For example, the pixel values are shifted from one column to the neighbouring column and/or from one row to the neighbouring row. Finally the up-sampled shifted images 606 are superposed or added to obtain the up-sampled shift-compensated image 608.

Figure 2C:
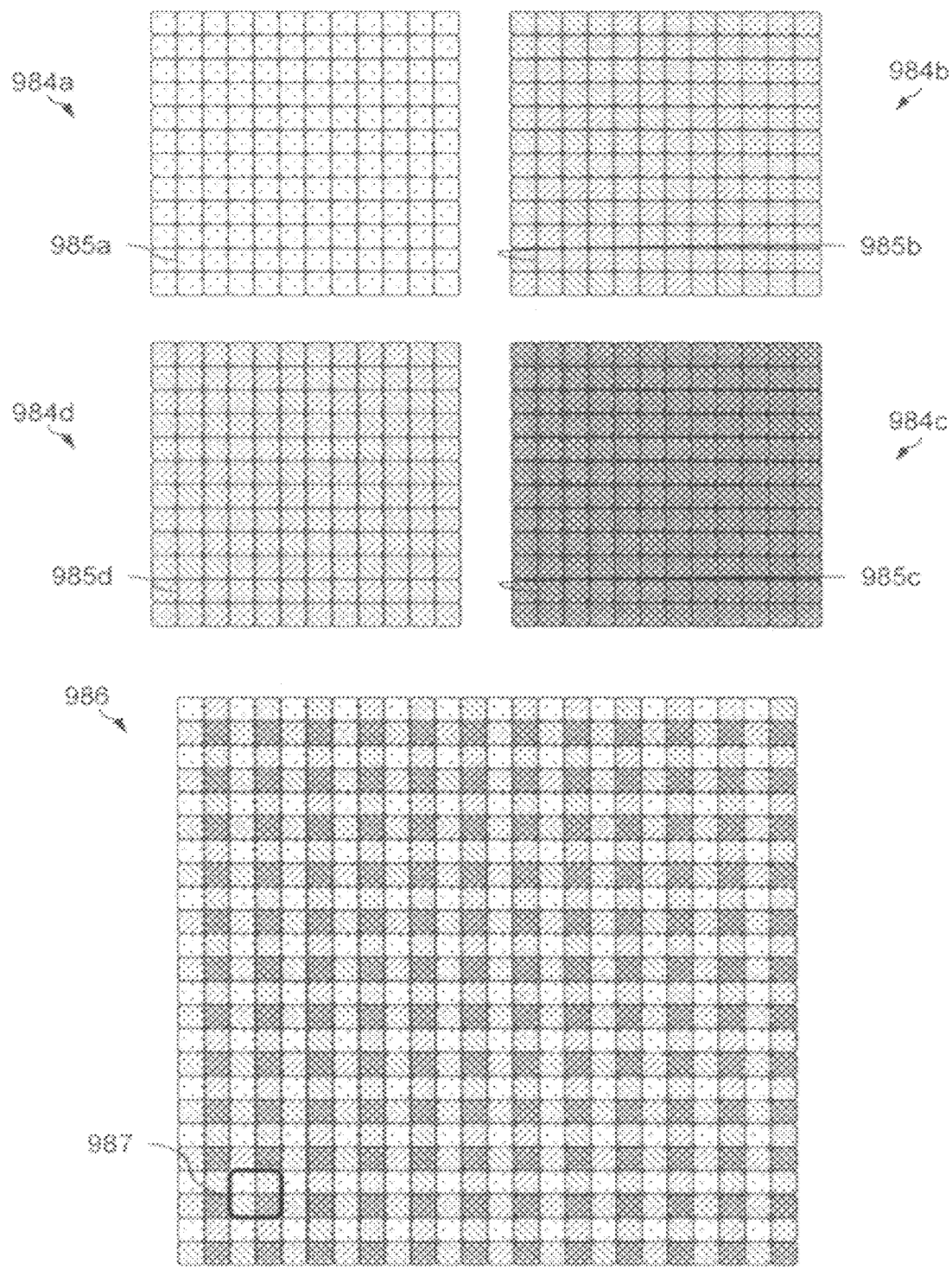
FIG. 2C is a schematic diagram illustrating a process of obtaining a mosaicked image on the basis of a plurality of monochromatic low-resolution images obtained by the arrangement of FIGS. 2A and B.

FIG. 2C refers to a process performed by the first calculator unit 240 of FIG. 4. In the upper half FIG. 2C shows the four monochromatic images 984a-d obtained from the four image sensor units 405a-d of FIG. 2B. Interdigitating corresponding pixel values may include shift compensation as used in super-resolution techniques. For example, corresponding pixel values 985a-d in the monochromatic low-resolution images may correspond to a pixel cluster 987 the mosaicked image 986. Grouping pixel values that are output by corresponding pixel sensors of all pixel units to pixel clusters according to the shift measures may consider pixel values of surrounding pixel sensors. The pixel clusters 987 are grouped in matrix corresponding to that of the pixel sensors. Within each pixel cluster 987, pixel values assigned to a certain filter colour are grouped to a matrix which mosaic pattern may correspond to the colour filter pattern formed by the colour filter units. For example, where the colour filter units are arranged to form a Bayer mosaic pattern, the pixel values in the pixel cluster 987 may also form a Bayer mosaic pattern.

Returning to FIG. 4 the camera system 450 further comprises a second calculator unit 250 for demosaicing the mosaicked image 986 of FIG. 2C. Demosaicing may contain interpolating, for each filter colour, missing pixel values on the basis of pixel values of neighbouring pixel sensors. The resulting image may be stored in a storage unit 260, for example as values representing three high-resolution monochromatic images.

FIG. 2D illustrates the demosaicing process. The mosaicked image 987 is transformed to a set 988 of high-resolution monochromatic images, from which an image reproduction unit may derive a high-resolution polychromatic image of the image object by a superposition process depending on the selected filter colours.

Figure 3:
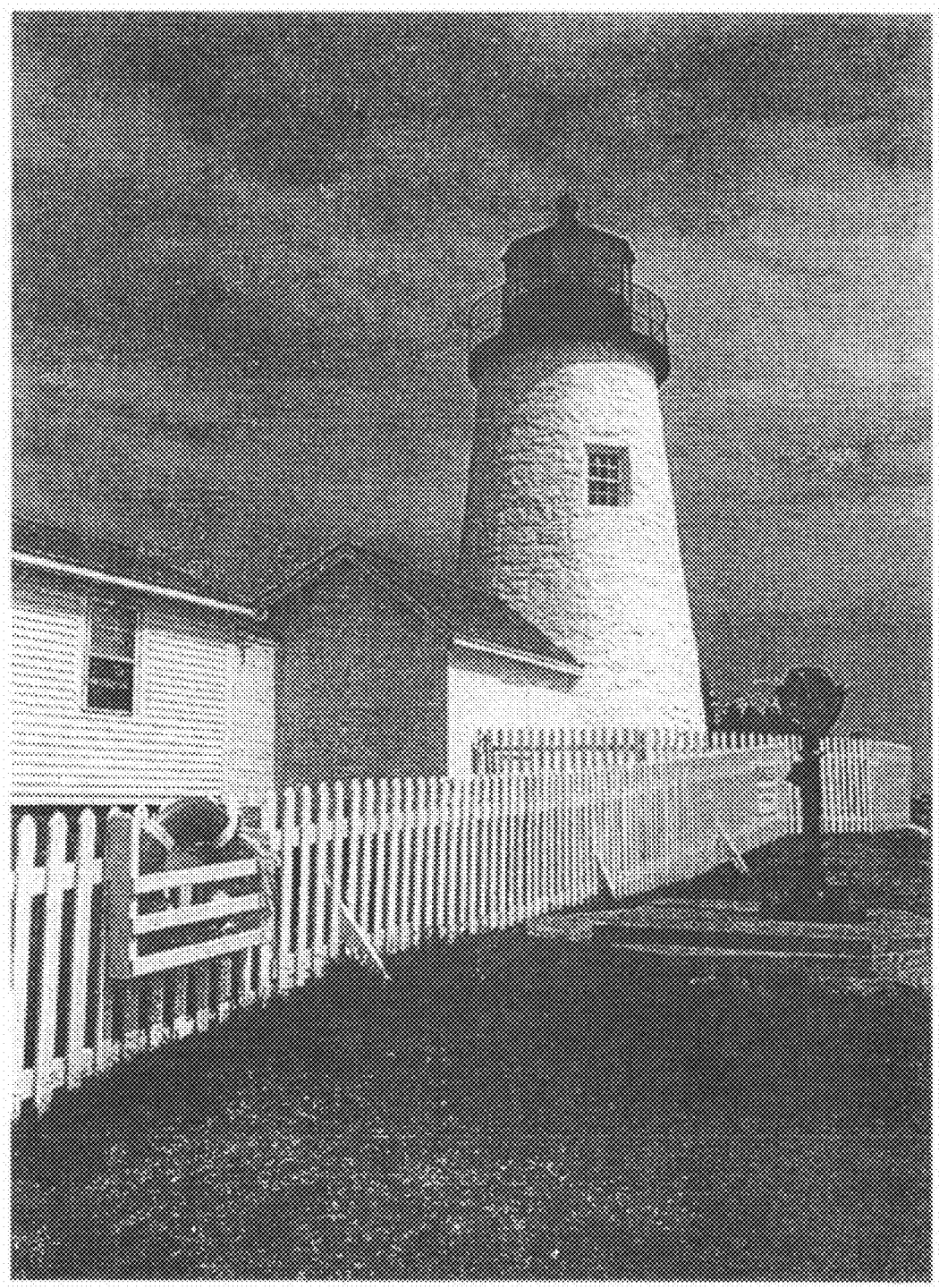
FIG. 3 shows a polychromatic high-resolution image obtained from the test scene of FIG. 1E by the process as illustrated in FIGS. 2C and D.

FIG. 3 shows the image as output by the camera system 450 of FIG. 4. The resulting image is free of colour errors and the occurrence of aliasing and zipper artefacts is reduced. Any demosaicing approach can be used to get the full up-sampled high-resolution polychromatic image, for example bilinear interpolation, median filtering or statistical modelling. Compared to a known approach for combining demosaicing with super-resolution techniques, less computational effort is required. The fabrication process for the colour filter units is significantly reduced, since all colour filter units are single-coloured, which also results in less chromatic aberrations resulting from manufacturing issues concerning mosaicked colour filter.

Elements of the above described embodiments, for example the first and second calculator units 240, 250 of the camera system 450 of FIG. 4 may be embodied in various forms, for example by hardware only, for example by integrated circuits, field programmable gate arrays (FPGAs), application specific integrated circuit (ASICs) or by software only, which may be implemented, for example in a computer program or a microcontroller memory, or by a combination of hardware and software.

FIG. 5A refers to a method of operating a camera system. The method provides guiding light through at least three lens units assigned to three single-colour colour filter units of at least three different colours such that at least three monochromatic low-resolution images of different colours are obtained (502). The at least three monochromatic, low-resolution images are fused to a polychromatic high-resolution image (504).

The lens units are arranged such that the at least three monochromatic low-resolution images are shifted to each other. Combining the at least three monochromatic low-resolution images to polychromatic high-resolution image may comprise fusing the monochromatic low-resolution images to a mosaicked image by a super-resolution technique comprising shift-compensation. The method may further provide demosaicing of the mosaicked polychromatic image by interpolating, for each filter colour, virtual pixel values on the basis of pixel values of neighbouring pixel sensors.

Figure 5B:
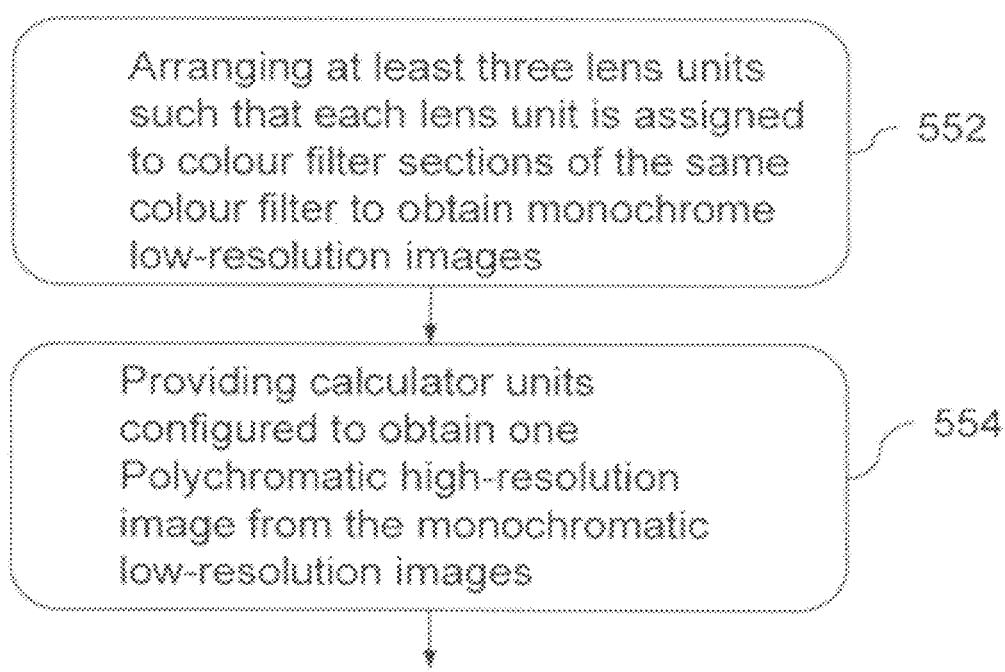
FIG. 5B is a simplified flowchart referring to a method of manufacturing a camera system in accordance with yet a further embodiment of the invention.

FIG. 5B refers to a method of manufacturing a lens and colour filter assembly. The method provides arranging at least three lens units and at least three single-colour colour filter units, wherein the plurality of colour filter units comprise colour filter sections with at least three different filter colours (552). The colour filter units are single-coloured such that each lens unit is assigned to one of at least three filter colours. Calculator units are provided for fusing the at least three monochromatic low-resolution images from the colour filter units to a polychromatic high-resolution image using shift-compensation and demosaicing (554).

The invention claimed is:
1. A camera system comprising:
   at least three lens units;
   at least three color filter units, each color filter unit being assigned to one of the at least three lens units and including a plurality of color filter sections; and at least three pixel units, each pixel unit being assigned to one of the lens units and including a plurality of pixel sensors arranged in a matrix, wherein the color filter sections have at least three different filter colors and each color filter unit is single-colored, and the at least three pixel units capture original monochromatic low-resolution images of a same scene or object that are pixel shifted versions imaged from deviating positions with respect to each other, and that are to be fused to form a polychromatic high-resolution image, each of the original monochromatic low-resolution images including a lower number of pixel values than a number of the pixel sensors that are available in the pixel units.

2. The camera system of claim 1, wherein
each lens unit includes a micro-lens array including a plurality of micro-lenses arranged in a matrix.

3. The camera system of claim 1, wherein
each color filter section assigned to one of the lens units is arranged such that light orthogonally incidenting on and passing through the one of the lens units passes through the color filter section.

4. The camera system of claim 1, wherein
the number of lens units is even and the lens units are arranged in a matrix.

5. The camera system according to claim 1, wherein each pixel unit includes a plurality of pixel sensors arranged in a matrix, and each pixel sensor is assigned to one of the color filter sections.

6. The camera system according to claim 1, wherein corresponding pixel sensors in different pixel units are shifted with respect to each other.

7. The camera system according to claim 1, wherein
each pixel sensor assigned to one of the color filter sections is arranged such that light orthogonally incidenting on and passing through the respective color filter section incidents on the pixel sensor.

8. The camera system according to claim 1, further comprising:
a first calculator unit configured to combine the original monochromatic low-resolution images obtained from the pixel units to form a mosaicked image by shift-compensating pixel values output by the pixel sensors of the pixel units in a regular manner.

9. The camera system according to claim 8, further comprising:
a second calculator unit configured to demosaic the mosaicked image that is polychromatic by interpolating, for each filter color, virtual pixel values on the basis of pixel values of neighboring pixel sensors.

10. A method of operating a camera system, the method comprising:
guiding light through at least three lens units, each lens unit assigned to a single-color color filter unit, each single-color color filter unit having another filter color, to obtain at least three original monochromatic low-resolution images of a same scene or object and of different colors, which are pixel shifted versions imaged from deviating positions with respect to each other, each of the original monochromatic low-resolution images including a lower number of pixel values than a number of pixel sensors that are available in pixel units, the pixel units each corresponding to a respective one of the lens units, and fusing the at least three original monochromatic low-resolution images to form a polychromatic high-resolution image.

11. The method of claim 10, wherein
the lens units are arranged such that the at least three original monochromatic low-resolution images are pixel shifted with respect to each other.

12. The method of claim 11, wherein
fusing the at least three original monochromatic low-resolution images to form a polychromatic high-resolution image includes
combining the original monochromatic low-resolution images obtained from the pixel units to form a mosaicked polychromatic image by interdigitating pixel values output by the pixel sensors of the pixel units, and
the pixel values are shift-compensated.

13. The method of claim 12, wherein interdigitating the pixel values includes
grouping pixel values output by corresponding pixel sensors of all pixel units to pixel clusters, wherein
each pixel cluster comprises a number of pixel values corresponding to the number of pixel units and wherein each pixel value of each pixel cluster is derived from another pixel unit, and
grouping the pixel clusters in a matrix corresponding to the pixel matrix.

14. The method of claim 12, wherein
fusing the at least three original monochromatic low-resolution images to form a polychromatic high-resolution image comprises
demosaicing the mosaicked polychromatic image by interpolating or estimating, for each filter color, virtual pixel values on the basis of pixel values of neighboring pixel sensors.

15. A method of manufacturing a camera system, the method comprising:
arranging at least three lens units and at least three color filter units, each color filter unit including a plurality of color filter sections with at least three different filter colors such that each color filter unit is monochromatic and assigned to one of the at least three lens units; and
providing at least three pixel units, each pixel unit assigned to one of the lens units, wherein
original monochromatic low-resolution images of a same scene or object captured by the pixel units are pixel shifted versions imaged from deviating positions with respect to each other, each of the original monochromatic low-resolution images including a lower number of pixel values than a number of pixel sensors that are available in the pixel units, and
providing calculator units for fusing the at least original three monochromatic low-resolution images to form a polychromatic high-resolution image.

16. The camera system of claim 1, wherein the original monochromatic low-resolution images are pixel shifted against one another with respect to a reference point, and pixel shifts between the original monochromatic low-resolution images include a pixel shift in a column direction and a pixel shift in a row direction.

17. The method of claim 10, wherein the original monochromatic low-resolution images are pixel shifted against one another with respect to a reference point, and pixel shifts between the original monochromatic low-resolution images include a pixel shift in a column direction and a pixel shift in a row direction.

18. The method of claim 15, wherein the original monochromatic low-resolution images are pixel shifted against one another with respect to a reference point, and pixel shifts between the original monochromatic low-resolution images include a pixel shift in a column direction and a pixel shift in a row direction.

19. The camera system of claim 16, wherein the reference point is a reference point in the same scene or object that is imaged, such that the at least three pixel units capture images of the same scene or object from the deviating positions.

20. The camera system of claim 1, wherein a pixel shift between the original monochromatic low-resolution images includes a sub-pixel shift.

* * * * *